US010750343B2

(12) United States Patent
Baer et al.

(10) Patent No.: US 10,750,343 B2
(45) Date of Patent: Aug. 18, 2020

(54) CONFIGURATION TECHNIQUE FOR AN EMERGENCY SESSION

(71) Applicant: Telefonaktiebolaget LM Ericsson (publ), Stockholm (SE)

(72) Inventors: Anders Baer, Årsta (SE); David Khan, Bromma (SE)

(73) Assignee: Telefonaktiebolaget LM Ericsson (publ), Stockholm (SE)

(*) Notice: Subject to any disclaimer, the term of this patent is extended or adjusted under 35 U.S.C. 154(b) by 0 days.

(21) Appl. No.: 15/528,590

(22) PCT Filed: Dec. 12, 2014

(86) PCT No.: PCT/EP2014/077594
§ 371 (c)(1),
(2) Date: May 22, 2017

(87) PCT Pub. No.: WO2016/091328
PCT Pub. Date: Jun. 16, 2016

(65) Prior Publication Data
US 2018/0352408 A1    Dec. 6, 2018

(51) Int. Cl.
*H04M 11/04* (2006.01)
*H04W 4/90* (2018.01)
(Continued)

(52) U.S. Cl.
CPC ............. *H04W 4/90* (2018.02); *H04W 24/04* (2013.01); *H04W 60/04* (2013.01);
(Continued)

(58) Field of Classification Search
CPC ....... H04W 4/02; H04W 4/029; H04W 64/00; H04W 76/50
See application file for complete search history.

(56) References Cited

U.S. PATENT DOCUMENTS 8,903,380 B2* 12/2014 Unger ................... H04W 48/18
455/404.2
2007/0242660 A1* 10/2007 Xu ........................ H04M 7/006
370/352
(Continued)

FOREIGN PATENT DOCUMENTS

CN    103037320 A    4/2013
CN    103139745 A    6/2013
(Continued)

OTHER PUBLICATIONS

3GPP, "3rd Generation Partnership Project; Technical Specification Group Services and System Aspects; Service aspects; Service principles (Release 13)", 3GPP TS 22.101 V13.3.0, Sep. 2014, pp. 1-88.
(Continued)

*Primary Examiner* — Shantell L Heiber
(74) *Attorney, Agent, or Firm* — Murphy, Bilak & Homiller, PLLC

(57) ABSTRACT

A technique for configuring a user equipment (100) for establishing an emergency session is provided. The user equipment (100) is wirelessly connected to a communications network (102). As to a method aspect of the technique, configuration information indicative of one or more networks available for the establishing of the emergency session is received via the communications network (102). A list of networks available for the establishing of the emergency session is maintained based on the received configuration information.

6 Claims, 9 Drawing Sheets

(51) Int. Cl.
  *H04W 76/50*  (2018.01)
  *H04W 24/04*  (2009.01)
  *H04W 60/04*  (2009.01)
  *H04W 64/00*  (2009.01)
  *H04W 76/18*  (2018.01)
  *H04W 4/50*  (2018.01)
  *H04W 48/16*  (2009.01)

(52) U.S. Cl.
  CPC ......... *H04W 64/006* (2013.01); *H04W 76/50* (2018.02); *H04W 4/50* (2018.02); *H04W 48/16* (2013.01); *H04W 76/18* (2018.02)

(56) References Cited

U.S. PATENT DOCUMENTS

| | | | |
|---|---|---|---|
| 2008/0130523 A1* | 6/2008 | Fridman | H04W 8/28 370/259 |
| 2011/0217979 A1* | 9/2011 | Nas | H04W 4/00 455/433 |
| 2012/0077488 A1 | 3/2012 | Unger et al. | |
| 2013/0090082 A1 | 4/2013 | Lim et al. | |
| 2013/0225161 A1* | 8/2013 | Chhabra | H04W 36/14 455/426.1 |
| 2013/0252649 A1 | 9/2013 | Siomina et al. | |
| 2015/0223070 A1* | 8/2015 | Chhabra | H04W 12/08 726/5 |
| 2015/0245388 A1* | 8/2015 | Yerrabommanahalli | H04W 4/90 455/404.1 |

FOREIGN PATENT DOCUMENTS

| | | | |
|---|---|---|---|
| CN | 103416100 A | 11/2013 | |
| EP | 2723126 A1 * | 4/2014 | ............ H04W 48/18 |
| EP | 2723126 A1 | 4/2014 | |
| WO | 2008021513 A2 | 2/2008 | |
| WO | 2010120689 A2 | 10/2010 | |
| WO | 2011083664 A1 | 7/2011 | |

OTHER PUBLICATIONS

3GPP, "3rd Generation Partnership Project; Technical Specification Group Core Network and Terminals; Numbering, addressing and identification (Release 12)", 3GPP TS 23.003 V12.0.0, Sep. 2013, 1-84.

3GPP, "3rd Generation Partnership Project; Technical Specification Group Services and System Aspects; IP Multimedia Subsystem (IMS); Stage 2 (Release 12)", 3GPP TS 23.228 V12.0.0, Mar. 2013, 1-290.

Unknown, Author, "Annual Incident Reports 2012", ENISA, Aug. 2013, 1-30.

* cited by examiner

600

| Country | Geographical Area | Network | Rank | |
|---|---|---|---|---|
| Sweden | Stockholm | ims.mnc07.mcc240.3gppnetwork.org | 1st | ⎫ |
| | | ims.mnc02.mcc240.3gppnetwork.org | 3rd | ⎬ 614 |
| | | ims.mnc08.mcc240.3gppnetwork.org | 2nd | |
| | | ims.mnc01.mcc240.3gppnetwork.org | 4th | ⎭ |
| | Gothenburg | ims.mnc07.mcc240.3gppnetwork.org | 2nd | ⎫ |
| | | ims.wlan_BB.non3gppnetwork.org | 1st | ⎬ 616 |
| | | ims.mnc07.mcc240.3gppnetwork.org | 3rd | ⎭ |
| | Gotland | ims.mnc08.mcc240.3gppnetwork.org | 1st | ⎫ |
| | | ims.wlan_GotlandEnergi.non3gppnetwork.org | 2nd | ⎬ 618 |
| | | ims.mnc07.mcc240.3gppnetwork.org | 3rd | ⎭ |

Fig. 6

CONFIGURATION TECHNIQUE FOR AN EMERGENCY SESSION

TECHNICAL FIELD

The present disclosure generally relates to a technique for configuring a user equipment that is wirelessly connectable or connected to a communications network. More specifically, and without limitation, methods and devices for configuring such a user equipment for establishing an emergency session are provided.

BACKGROUND

The ubiquity of mobile communication is for the benefit of emergency notifications. When an emergency session is initiated from an authenticated user equipment (UE), the UE determines whether its communication resources are sufficient to establish the emergency session. The UE is authenticated, e.g., using a Subscriber Identity Module (SIM, including a Universal SIM, a CDMA SIM or an International SIM) implemented in a SIM card such as a Universal Integrated Circuit Card (UICC). In case of insufficient resources due to other ongoing sessions, the UE terminates any ongoing communication and releases reserved bearer resources. In the packet-switched (PS) domain of mobile telecommunication, e.g., when the UE is wirelessly connected to an Internet Protocol (IP) Connectivity Access Network (IP-CAN) according to the $3^{rd}$ Generation Partnership Project (3GPP), the UE registers an IP bearer at the IP-CAN.

UEs can be used in different countries requiring different emergency numbers. A traveller visiting a foreign country does not have to know the local emergency numbers. The UE or the SIM card can have a pre-programmed list of emergency numbers. For example, a network operator can issue a SIM card that includes a limited number of country-specific emergency numbers. When the UE recognizes that an emergency number is dialed, it initiates an emergency session setup that is routed by the network to an emergency entity, also when roaming abroad. Furthermore, the Global System for a Mobile communications network (GSM) includes functionality, e.g., the Over The Air technology, for updating and changing data in the SIM card without having to reissue it.

However, there are UEs without SIM functionality, e.g., if the SIM card is not inserted in the UE, or if the UE is not adapted to receive a SIM card such as tablets running a VoIP client with WiFi connectivity. Furthermore, also if the UE is authenticated based on its SIM data, setting up an emergency session may fail, e.g. if call routing fails, so that the UE will remain on the authenticated communication network.

As a consequence, even though there might be other networks that could assist the user with the emergency service, the UE will not automatically access those networks. A user would have to manually select another (e.g., unauthenticated) network, optionally after removing the SIM card from the UE, and trigger the emergency session setup by the UE. In an emergency situation, with the stress brought to the user by the situation, such tedious procedure is unrealistic and improper.

Factual serviceability reported for the year 2012 to the European Network and Information Security Agency (ENISA) for the electronic communications sectors indicate too frequent incidents of users that could not use their emergency service during the reported incidents, because a service outage of the emergency service occurred. The report is published under http://www.enisa.europa.eu/activities/Resilience-and-and-CIIP/Incidents-reporting/annual-reports/annual-incident-reports-2012. As a result, the user could not setup the emergency service, e.g. by dialing the emergency number 112.

More specifically, the emergency number 112 was unavailable in 37% of the incidents. The root cause identified for 75% of the reported incidents was "System failure". Notably, this was the most frequent root cause category for each of the four services fixed and mobile telephony as well as fixed and mobile Internet. Within the category "System failure", hardware failures were the most frequent cause, followed by software bugs. Network components most often affected by the "System failure" include switches in general (e.g., routers and local exchange points) and home location registers.

SUMMARY

Accordingly, there is a need for a technique that reliably establishes an emergency session in at least some situations.

As to one aspect, a method of configuring a user equipment for establishing an emergency session is provided. The user equipment is wirelessly connected to a communications network. The method comprises the step of receiving, via the communications network, configuration information indicative of one or more networks available for the establishing of the emergency session; and the step of maintaining a list of networks available for the establishing of the emergency session based on the received configuration information.

At least in some implementations, based on the list updated by the reception of configuration information, the user equipment is provided with one or more fallback options for emergency networks, e.g., networks on which the user equipment may initiate the emergency session with or without being authenticated.

Within the context of the present disclosure, the term "user equipment" refers to a device for instance used by a person for his or her personal communication. The user equipment may include a telephone type of device, for example a telephone, smartphone or a SIP phone, cellular telephone, a mobile station, cordless phone, or a personal digital assistant type of device, for example laptop, notebook, notepad equipped with a wireless data connection. The user equipment may also be associated with non-humans including animals, plants and machines.

The user equipment may be equipped with an identification module, e.g., a Subscriber Identity Module (SIM) comprising unique identities such as an International Mobile Subscriber Identity (IMSI) and/or a Temporary Mobile Subscriber Identity (TMSI) associated with a subscriber using the user equipment. The presence of a SIM within the user equipment may customize the user equipment uniquely, e.g., with a subscription of the subscriber.

A request may be sent to the communications network. The configuration information may be received in response to the request. The request may include at least one of a packet-switched (PS) attach request and an Internet Protocol (IP) Multimedia Subsystem (IMS) registration request. The request may further relate to an authentication of the user equipment, a bearer allocation, and/or a Session Initiation Protocol (SIP) registration.

E.g., in addition to the IMS registration procedure, the information on available emergency networks may be obtained during the PS attach. In case of IPv4, the PS attach request may include a Dynamic Host Configuration Protocol version 4 (DHCPv4) request message. In case of IPv6, the PS attach request may include a Router Solicitation (RS) message, a Neighbor Solicitation (NS) message and/or a Dynamic Host Configuration Protocol version 6 (DHCPv6) request message.

The configuration information may be inserted into the response to the request. E.g., the configuration information may be inserted by a node of an Evolved Packet Core (EPC), a node of an Internet Protocol Multimedia Subsystem (IMS) and/or a Home Subscriber Server (HSS). Alternatively or in addition, the inserting node may include a Proxy-Call Session Control Function (P-CSCF) or a Mobility Management Entity (MME).

The communications network to which the user equipment is wirelessly connected and/or at least one of the one or more networks indicated by the configuration information may include one or more visited networks. The one or more visited networks may be different from a home network, e.g., a home network to which an identity of the user equipment is associated or at which the user equipment is subscribed. The identity and/or subscription information may be provided by the user equipment, e.g., in communication with the HSS. Alternatively, the mobile device may establish the emergency session on the network selected from the list as an unauthenticated mobile device, e.g., without a subscriber profile provided by the HSS.

The configuration information may be received and/or the list may be updated responsive to the user equipment connecting to another network and/or responsive to the user equipment moving to another tracking area, routing area, location area or cell area of the communications network. E.g., the reception and/or the update may be triggered by IMS roaming of the user equipment. E.g., the list of emergency networks may be updated during roaming.

The one or more networks, which are indicated by the configuration information, may include any type of Internet Protocol Connectivity Access Network (IP-CAN). Each of the one or more networks indicated by the configuration information may be indicated by a Uniform Resource Indicator (URI). The configuration information may be included in a SIP message. E.g., the configuration information may be included in a private header of the SIP message.

The establishment of the emergency session may be initiated on at least one of the one or more networks in the list. The configuration information may further indicate a rank for each of the one or more available networks. E.g., in addition to the information returned to the user equipment on available emergency networks, the available emergency networks are ranked. Two or more networks may be indicated by the configuration information. A sequence of the two or more indicated networks within the configuration information may determine the rank. Alternatively or in addition, the configuration information may include an indicator of the rank, e.g., in association with each of the one or more networks.

Alternatively or in addition, the configuration information may include an indicator of a geographical area in association with each of the one or more networks. The geographical area may indicate a coverage area of the associated network. Alternatively, the geographical area may be smaller than a coverage area of the associated network.

The emergency session establishment may be initiated in response to a failure of a previous emergency session establishment attempt, e.g., on the communications network to which the user equipment is currently connected. The at least one network, on which the emergency session is initiated, may be selected from the list, e.g., based on at least one of the associated rank and the associated geographical area.

The establishment of the emergency session may be further initiated on a further network of the list. The further network may be subordinately ranked relative to the selected at least one network. The further initiation may be triggered by a failure of the emergency session establishment on the selected network. The user equipment may automatically retry on the next-ranked network if an emergency session fails.

The rank associated to the listed networks may be a primary criterion for selecting the network from the list. Signal strength of the listed network may be a secondary criterion subordinate to the primary criterion. The ranking may be based on the best emergency network at a specific geographical location, e.g., in addition to a conventional signal strength selection criterion. Alternatively, the network may be selected from the list independent of the signal strength.

The communications network and/or the one or more indicated networks may include cellular telecommunications networks. The one or more networks indicated by the configuration information may include networks accessible by a Radio Access Technology (RATs) and/or accessible on a frequency different from the one of the communication network to which the mobile device is wirelessly connected. Establishing the emergency session may include placing an emergency call.

Each of the steps described for above method aspect may be performed by the user equipment.

As to a further aspect, a method of configuring a user equipment for establishing an emergency session is provided. The user equipment is wirelessly connected to a communications network. The method comprises the step of determining networks available for the establishing of the emergency session; and the step of sending, towards the user equipment, configuration information indicative of one or more networks available for the establishing of the emergency session based on the determination.

The one or more networks may be determined by accessing a database indicative of networks available for the establishing of the emergency session.

The configuration information may be inserted into a message forwarded via the communications network towards the user equipment. A request from the user equipment may be received. The configuration information may be inserted into a response to the request.

The indicated networks may be selected depending on the communications network to which the user equipment is wirelessly connected. Alternatively or in addition, the indicated networks may be selected depending on a current geographical area of the user equipment. The request may be indicative of the communications network to which the user equipment is wirelessly connected and/or the current geographical area of the user equipment. Alternatively or in addition, the current geographical area of the user equipment may be retrieved from the MME or by means of other network components.

Each of the steps described for the further method aspect may be performed by the communications network to which the user equipment is connected and/or the home network of the user equipment.

As to a still further aspect, a computer program product is provided. The computer program product comprises program code portions for performing the steps of any one of above aspects, e.g., when the computer program product is executed on one or more computing devices. The computer program product may be provided on a computer-readable recording medium and/or for download onto such a computer-readable recording medium in a data network, e.g., the communications network and/or the Internet.

As to a hardware aspect, a device for configuring a user equipment for establishing an emergency session is provided. The user equipment is wirelessly connected to a communications network. The device comprises a receiving unit adapted to receive, via the communications network, configuration information indicative of one or more networks available for the establishing of the emergency session; and a maintaining unit adapted to maintain a list of networks available for the establishing of the emergency session based on the received configuration information.

The device may be installed at the user equipment. The device may further be adapted to perform any one of the steps of above method aspects.

As to a further hardware aspect, a device for configuring a user equipment for establishing an emergency session is provided. The user equipment is wirelessly connected to a communications network. The device comprises a determining unit adapted to determine networks available for the establishing of the emergency session; and a sending unit adapted to send, towards the user equipment, configuration information indicative of one or more networks available for the establishing of the emergency session based on the determination.

The device may be installed at the communications network to which the user equipment is connected and/or a home network of the user equipment. The device may further be adapted to perform any one of the steps of above method aspects.

BRIEF DESCRIPTION OF THE DRAWINGS

In the following, the technique is described in more detail with reference to exemplary embodiments illustrated in the drawings, wherein:

FIG. 6 schematically illustrates an exemplary list of networks available for establishing an emergency session, which can be maintained by the device of FIG. 2 or determined by the device of FIG. 4;

DETAILED DESCRIPTION

In the following description, for purposes of explanation and not limitation, specific details are set forth, such as specific network environments and communication interfaces in order to provide a thorough understanding of the technique disclosed herein. It will be apparent to one skilled in the art that the technique may be practiced in other embodiments that depart from these specific details. Moreover, while the following embodiments are primarily described for a Long Term Evolution (LTE) implementation, it will be readily apparent that the technique described herein may also be implemented in other mobile and stationary communication networks, including GSM networks, UMTS networks and LTE-Advanced networks.

Moreover, those skilled in the art will appreciate that the services, functions, steps and units explained herein may be implemented using software functioning in conjunction with a programmed microprocessor, an Application Specific Integrated Circuit (ASIC), a Field Programmable Gate Array (FPGA), a Digital Signal Processor (DSP) or a general purpose computer, e.g., including an Advanced RISC Machine (ARM). It will also be appreciated that, while the following embodiments are primarily described in context with methods and devices, the invention may also be embodied in a computer program product as well as in a system comprising a computer processor and memory coupled to the processor, wherein the memory is encoded with one or more programs that may perform the services, functions, steps and implement the units disclosed herein.

Figure 1:
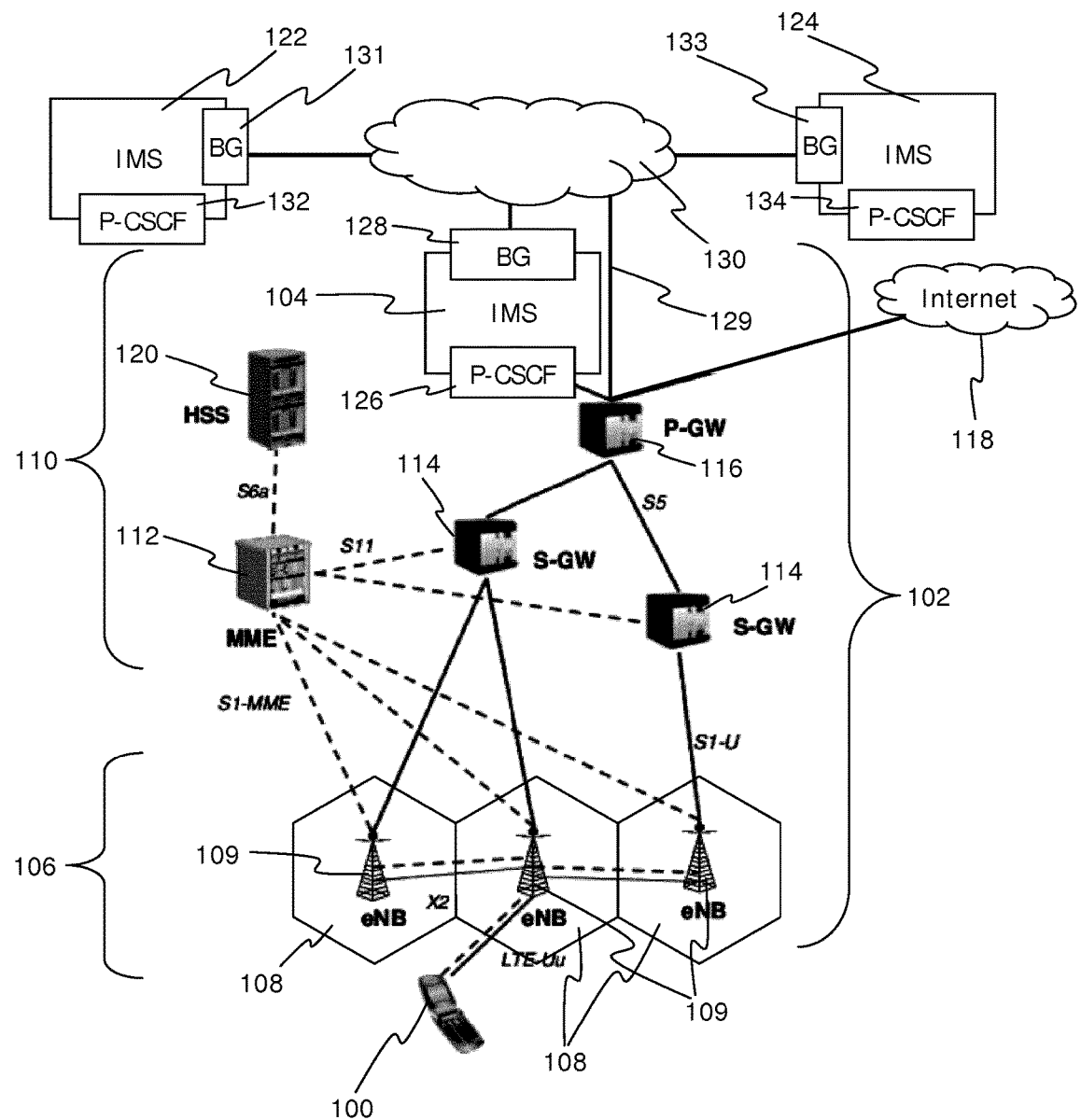
FIG. 1 schematically illustrates a user equipment connected to a communications network.

FIG. 1 schematically illustrates a User Equipment (UE) 100 wirelessly connected to a communications network 102. The communications network provides Internet Protocol (IP) connectivity to the user equipment 100. E.g., the communications network 102 includes an IP Connectivity Access Network (IP-CAN) or a combination of different IP-CANs.

The communications network 102 includes, or is connected to, an IP Multimedia Subsystem (IMS) 104. The IMS 104 provides IP multimedia services including Voice over IP (VoIP) services. The IMS is accessible via the IP-CAN. Any IP-enabled device can access the IMS once authenticated. Latter authentication for IMS services is subsequent to a previous authentication for which the IP-CAN is responsible (3GPP TS 23.228, Release 12, Clause 4.2.5). The UE 100 is able to initiate an emergency session, e.g., for a voice session to a Public Safety Answering Point (PSAP), in the IP domain using the IMS 104 or any other Packet Data Network (PDN) accessible via the communications network 102.

The communications network 102 includes a Radio Access Network (RAN) 106. The RAN 106 is structured in cells 108. Each cell is associated to a base station 109. Each cell 108 provides to the UE 100 wireless access to the communications network 102 within a cell area. The RAN 106 can be implemented as a homogeneous network (e.g., including adjacent or partially overlapping cells 108) or a heterogeneous network (e.g., including overlaying cells 108 having differently sized cell areas).

Examples for cellular IP-CANs include a General Packet Radio Service (GPRS) network, an Enhanced Data Rates for GSM Evolution (EDGE) network, a UMTS Terrestrial Radio Access Network (UTRAN) and an Evolved UTRAN (E-UTRAN). Alternatively or in addition, the communications network 102 includes IP-CANs with non-3GPP RANs, such as a Wireless Local Area Network (WLAN) according to the standard series IEEE 802.11 or Worldwide Interoperability for Microwave Access (WiMAX) according to the standard series IEEE 802.16.

The communications network 102 further includes a Core Network (CN) 110. The CN 110 is connected to the RAN 106. The CN 110 includes, or is connected to, the IMS 104.

In the exemplary Long Term Evolution (LTE) implementation of the base stations 109 illustrated in FIG. 1, the CN 110 includes an Evolved Packet Core (EPC) and the RAN 106 includes the E-UTRAN. The communications network 102 and the UE 100 are also referred to as Evolved Packet System (EPS).

The EPC 110 includes a Mobility Management Entity (MME) 112 implemented as a control node for the RAN 106. A serving gateway (S-GW) 114 is connected to one or more base stations 108. The S-GW 114 routes and forwards user data packets for connected UEs 100. During intra-RAN handovers, the S-GW 114 acts as a mobility anchor for the user plane. For UEs in the idle state, the S-GW 114 terminates the downlink data path and triggers paging, when downlink data arrives at the EPC 110 for the idle-state UE. The MME 112 is responsible for paging the idle-state UE.

A Packet Data Network Gateway (P-GW) 116 in the EPC 110 provides connectivity for the UE 100 to external PDNs, e.g., the Internet 118, and the IMS 104. In the presence of non-3GPP technologies such as WiMAX, the P-GW 116 acts as an anchor for mobility between 3GPP and non-3GPP technologies.

A Home Subscriber Server (HSS) 120 is a database that contains user-related and subscription-related information. The functions of the HSS 120 include user authentication and access authorization. The communications network 102 is identified by a combination of a country code, e.g. a Mobile Country Code (MCC) according to ITU Recommendation E.212, and a service provider code, e.g., a Mobile Network Code (MNC).

When camping on or entering a cell area 108, the UE 100 connects to the RAN 100 by sending a Packet-Switched (PS) attach request to the IP-CAN. The MME 112 receives the PS attach request from the UE 100 and responds by requesting the identity of the UE. If the UE 100 is authenticated by the HSS in the communications network 102, the communications network 102 may be referred to as the home network of the UE 100. Otherwise, the communications network 102 may be referred to as a visited network for the UE 100. For authentication, the visited network refers to an HSS in another communications network 122 that is the home network of the UE 100.

The communications network 102 is connected to other communications networks 122 and 124 via the P-GW 116, e.g. for authenticating roaming UEs 100 or establishing a session with a PSAP connected to any one of the communications network 122 and 124. For IMS roaming, the P-GW 114 is connected to a Proxy-Call Session Control Function (P-CSCF) 126 of the IMS 104. The IMS 104 is connected via a Border Gateway (BG) 128 of the IMS 104 to an IMS of the other communication networks 122 and 124 via their P-CSCF 132 or 134, respectively. Alternatively or in addition, the P-GW 114 is configure to route data packets to (and receive data packets from) the other communication networks 122 and 124, e.g., without IMS interworking, which is indicated by line 129 in FIG. 1.

The connectivity between networks 102, 122 and 124 optionally includes an Inter-Service Provider IP backbone 130. The IMS 122 and the IMS 124 include a BG 131 and 133, respectively, interfacing the backbone 130.

The P-CSCF 126 is the first IMS node encountered when the UE 100 is trying to establish a session. The P-CSCF locates an I-CSCF. If routing determines that the session is destined for another IMS network 122 or 124, the BG forwards the message to the P-CSCF 132 or 134 in the destination IMS network. E.g., if a Uniform Resource Indicator (URI) provided by the UE 100 does not resolve to the IP address of the P-CSCF 126 in the IMS 104 of the communications network 102, the URI can specify the P-CSCF 132 of the communications network 122 or the P-CSCF 134 of the communications network 124.

The I-CSCF of the IMS specified by the URI locates a Serving-Call Session Control Function (S-CSCF) for the UE 100. The S-CSCF serving the UE 100 is thus located in the communications network 102, 122 or 124 according to the URI. The S-CSCF functions as control instance for the subscriber in the corresponding IMS domain. The S-CSCF determines the resources needed to handle the session. The S-CSCF routes SIP messages to the UE 100 via the P-CSCF 126, 132 or 134 that is connected to the UE 100.

Figure 2:
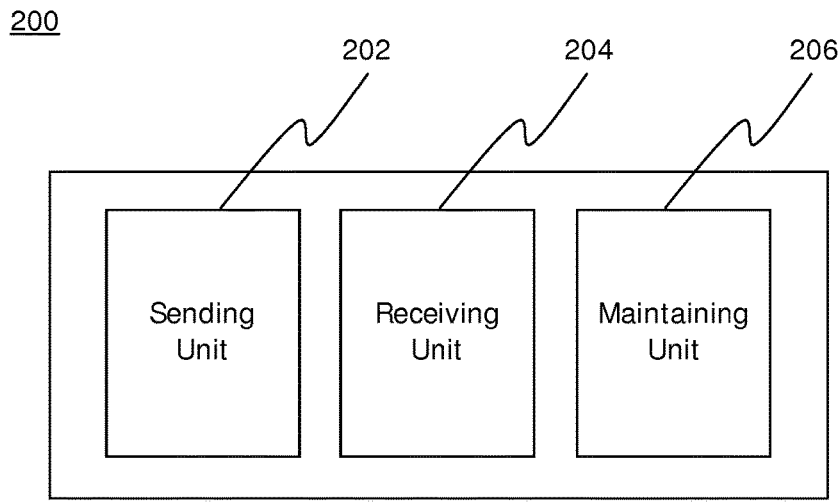
FIG. 2 shows a schematic block diagram of a device embodiment for configuring a user equipment for establishing an emergency session, which is implementable in the user equipment of FIG. 1.

FIG. 2 illustrates a schematic block diagram of a device 200 for configuring a user equipment, e.g., the UE 100 wirelessly connected to the communications network 102. The device 200 comprises a sending unit 202 and a receiving unit 204 for communicating with the communications network 102. A maintaining unit 206 maintains configuration information.

Figure 3:
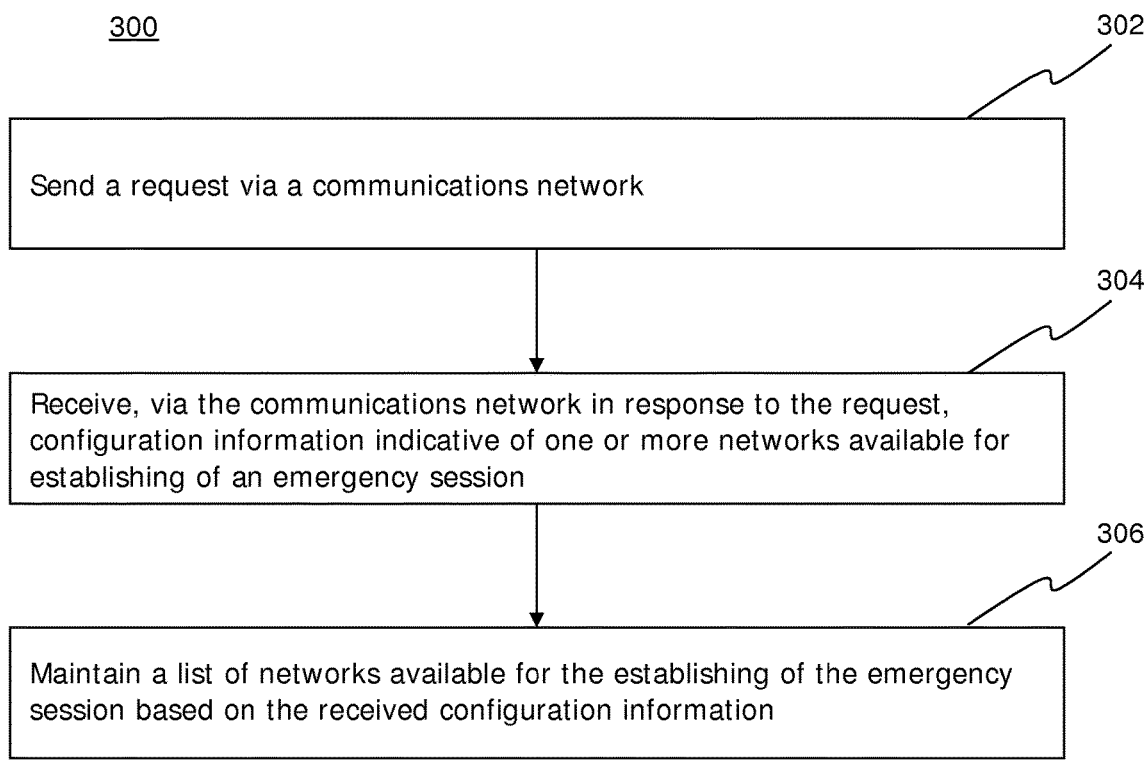
FIG. 3 shows a flowchart of a method embodiment for configuring a user equipment for establishing an emergency session, which can be performed by the device of FIG. 2.

The device 200 is operated according to a method 300 of configuring a user equipment, a flowchart of which is shown in FIG. 3. In a step 302, the sending unit 202 sends a first message, e.g., a request message, to the communications network 102. In response to the first message, the receiving unit 204 receives a second message including configuration information in a step 304. The unit 206 maintains, according to a step 306, the received configuration information. The configuration information is indicative of networks available for establishing an emergency session.

Figure 4:
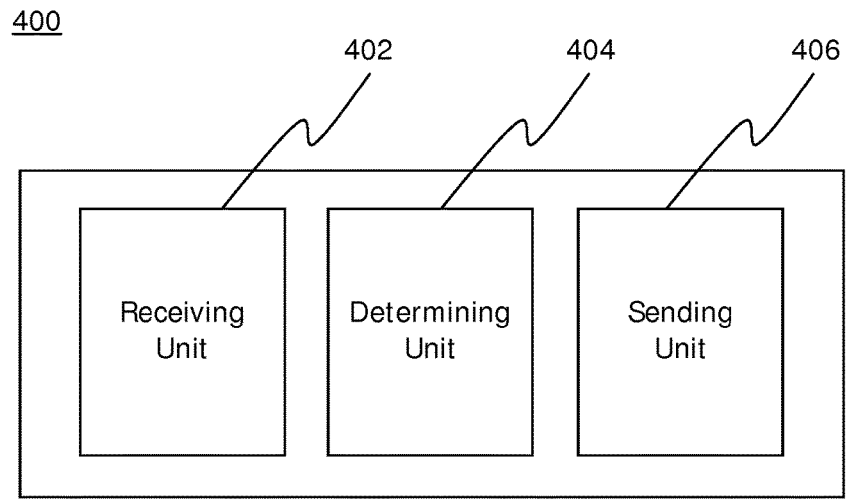
FIG. 4 shows a schematic block diagram of a device embodiment for configuring a user equipment for establishing an emergency session, which is implementable at the communications network of FIG. 1.
Figure 5:
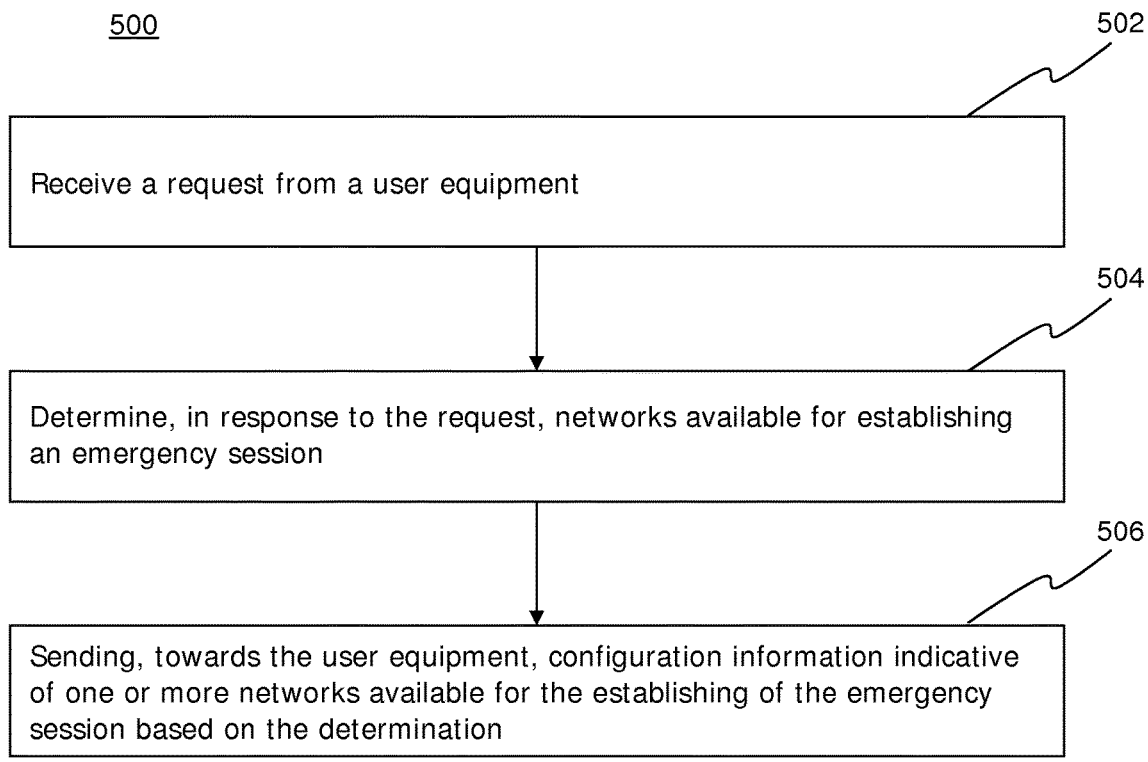
FIG. 5 shows a flowchart of a method embodiment for configuring a user equipment for establishing an emergency session, which can be performed by the device of FIG. 4.

While each of the device 200 and the method 300 allows implementing the technique at the UE 100, the technique is exemplarily described from the perspective of the communications network 102 with reference to FIGS. 4 and 5.

FIG. 4 illustrates a schematic block diagram of a device 400 for configuring a user equipment, e.g., the UE 100 wirelessly connected to the communications network 102. The device 400 comprises a receiving unit 402 and a sending unit 406 for communicating with the UE 100. A determining unit gathers information as to available networks, e.g., specifically for the location and/or capabilities of the UE 100.

The device 400 is operated according to a method 500 of configuring a user equipment, a flowchart of which is shown in FIG. 5. In a step 502, the receiving unit 402 receives a first message, e.g., a request message, from the UE 100. Alternatively or in addition, the receiving unit 402 receives a response message (e.g., a response to the first message) that is to be forwarded to the UE 100. In response to the message reception in the step 502, the determining unit 404 determines networks available for establishing an emergency session in a step 504, e.g., the networks 122 and 124. In a step 506, the sending unit 406 sends a second message including configuration information indicative of at least one of the networks determined in the step 504.

The second message does not have to be a message exclusively supplying the configuration information. Rather, the second message may be a message sent according to a communication protocol in response to the first message. The configuration information is inserted in the response message. Particularly, a node receiving the first message and/or sending the response message may be different from a node inserting the configuration information in the response message resulting in the second message.

By inserting in an information message back to the UE 100 configuration information about available networks for emergency sessions, the UE 100 is configured to select a network 102, 122 or 124 suitable for establishing the emergency session from the list, optionally accounting for an order in which the networks are to be tried when an emergency session cannot be successfully established in the first place.

The insertion of the configuration information is handled by the device 400 that has knowledge of the available networks or is able to gather such information. To this end, the device 400 is installed at, e.g., the EPC 110, the HSS 120 or the P-CSCF 126.

In an exemplary implementation of the technique, the configuration information is inserted as an information element, e.g. a data field "visited-emergency-networks", in a message to the UE 100. FIG. 6 show a table representing the configuration information 600 indicative of available networks 602 that the UE 100 can use for emergence sessions.

The configuration information 600 further includes a rank 608 of the networks 602. The rank 602 indicates in what order the corresponding networks 602 are to be tried for establishing an emergency session by the UE 100. The configuration information 600 indicates a country 604 and, optionally, geographical areas 606 for the country 604 for each of the networks 602.

A similar or equal list of emergency networks 602 may be maintained at the device 200, optionally with the geographical preferences 604, 606 and the ranking 608 of the indicated networks 602.

The available networks 602 are indicated by means of an URI, e.g., the URI resolving to the P-CSCF 132 or 134 of the corresponding external IMS networks 122 and 124, respectively. While a URI 610 can have an arbitrary format, in the case of a 3GPP network, a URI 612 is preferably structured using the MNC and the MCC according to
"ims.mnc<MNC>.mcc<MCC>.3gppnetwork.org".

As illustrated in FIG. 6, the same network of provider MNC=7 may be reported in Stockholm and Gothenburg. Thus, the indicator 606 of the geographical area allows further specifying network selection. Among a group of networks 614, 616 or 618 available in the same geographical area or in overlapping geographical areas, the rank 608 is decisive for the network selected by the UE 100. Herein, a network may be "available", if the UE 100 can physically attach to it.

The configuration information 600 including the network information 602 is forwarded to the UE 100 at a point in time prior to the need to establish the emergency session. The point in time may be triggered by a network event. The list of reported networks 602 is optionally updated when the cell area 108, the tracking area or the routing area of the UE 100 changes. The granularity of the reported networks 602 may be coarser than the cell area 108, the routing area (for GPRS or UMTS networks 102) or the tracking area (in LTE networks 102, managed by the MME 112). E.g., the configuration information 600 is sent to the UE 100 (in the step 506) and received at the UE 100 (in the step 304) as part of a network attach procedure or a registration procedure.

Figure 7:
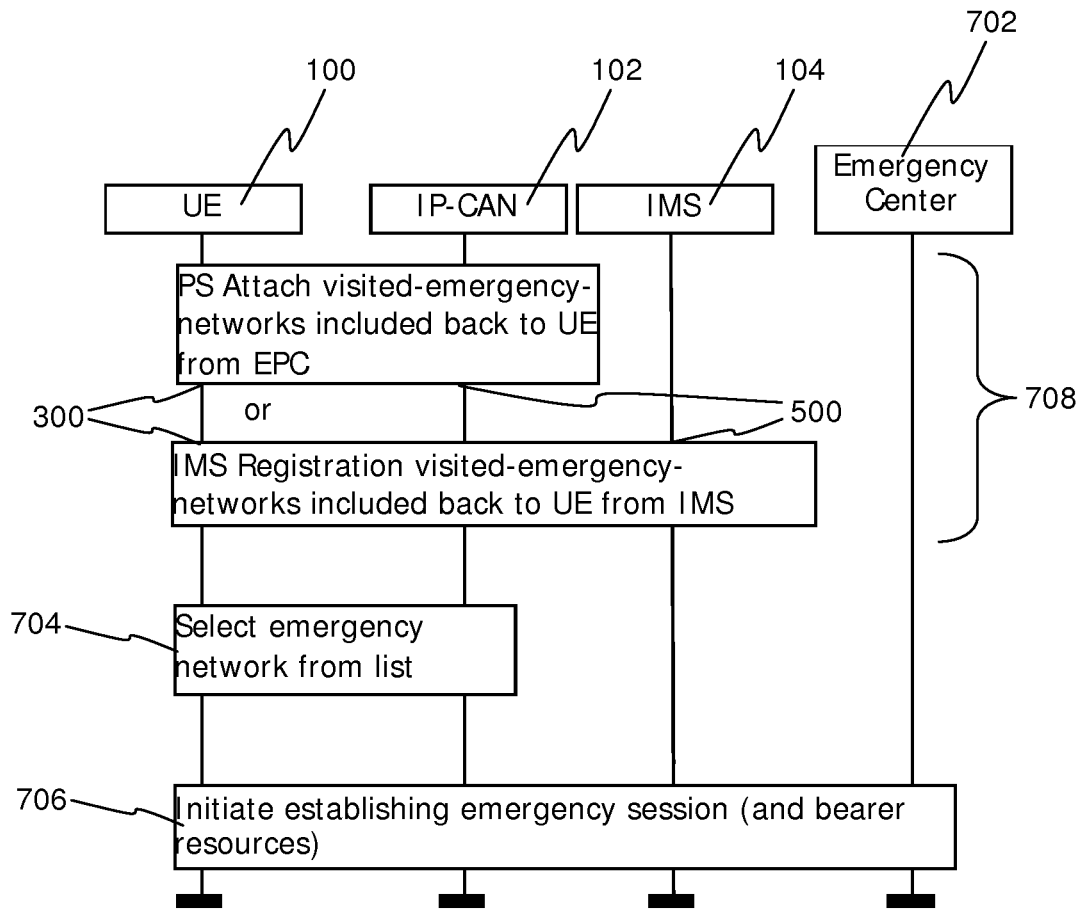
FIG. 7 illustrates a communication for establishing an emergency session using the list of FIG. 6.

FIG. 7 schematically illustrates a communication sequence 700 for emergency network selection. The technique may be implemented as part of the PS attach sequence or in the IMS registration process. The device 400 may be implemented in the PS domain and/or the IMS 104 of the communication network 102 and provides in the step 506 information on available networks 602 that the UE 100 can use.

FIG. 7 schematically illustrates the communication sequence 700 for establishing a session with an emergency center or PSAP 702 as a result of the technique. The configuration information 600 is included in the data field "visited-emergency-networks" of a Packet-Switched Attach response message or carried in a SIP header or URI parameter with the possibilities to transport the configured emergency networks 602 and, optionally, the geographical areas 606 for the country 604 that the UE 100 is staying in.

A request 708 is transmitted according to the step 302 of the method 300 and received according to the step 502 of the method 500. The request 708 thus triggers the methods 300 and 500. The IMS registration requires a successful PS attach request. In an unauthenticated mode, the IMS registration is omitted. The triggering request 708 may be implemented by the PS attach request or, where applicable, by the IMS registration request.

The UE 100 selects in a step 704 an emergency network 602 based on the maintained list and initiates session establishment in a step 706. E.g., the UE 100 establishes an unauthenticated emergency call according to the listed networks after an authenticated emergency call has failed.

By way of example, the UE 100 receives in the step 304 the list of emergency networks that best match a specific geographical area, e.g., that provide the best service for the specific geographical area. After replacing or updating the list "visited-emergency-networks" stored in the device 200 in the step 306, the UE 100 selects for the specific country and the served geographical area the emergency network 602 that is matching the best available access that the UE 100 can attach to, in the step 704.

For the emergency service, it is usually important to get access to the service as quick as possible, which is further supported by the rank indicator 608 based on which the UE 100 has the possibility of try the available networks in a specified order. The order may be based on known network coverage, network capacity, network performance, etc. The ranking does not have to be limited to signal strength (that is a conventional criterion for choosing networks).

Figure 8:
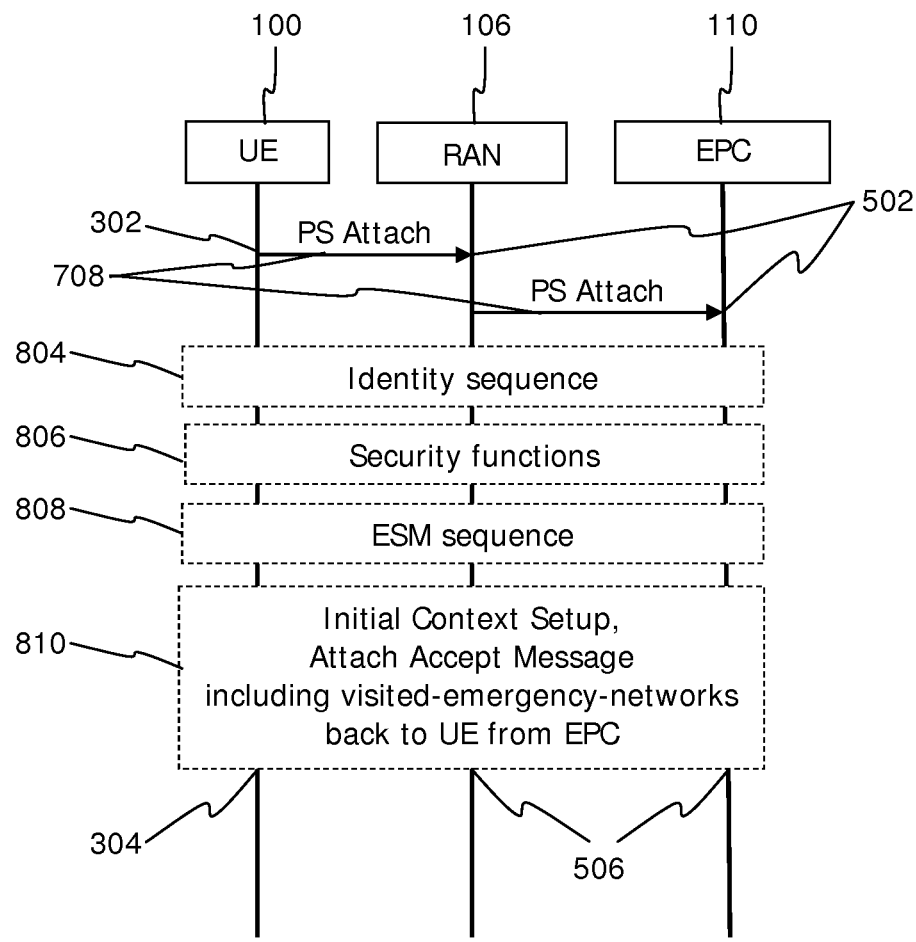
FIG. 8 illustrates a communication that triggers the methods of FIGS. 3 and 5.

FIG. 8 schematically illustrates a communication sequence 800 for UE attach and emergency network retrieval. The UE 100 successfully attaches by sending the IP attach request 708 to the RAN 106 or any other IP-CAN in the step 302. The PS attach request 708 is forwarded to the EPC 110. After exchanging UE identity in a step 804, UE authentication in a step 806 and an EPS Session Management (ESM) sequence in a step 808, the prioritized "visited-emergency-networks" list is downloaded via the communications network 102 in a step 810.

The list is stored in the UE 100 according to the step 306. The list maintained at the UE 100 thus geographically corresponds to the current location of the UE 100.

To maintain accuracy of the "visited-emergency-networks" list as the UE 100 moves, the list is downloaded again to correspond to the geographically available networks. In one implementation, the "visited-emergency-networks" list is downloaded as soon as possible to ensure that the UE 100 has the list prior to any emergency calls attempts. This enables the UE 100 and its user to take advantage of the "visited-emergency-networks" list as soon as possible in case of emergency call need.

While FIG. 8 illustrates an exemplary implementation using the PS attach request as the triggering request 708, the following exemplary implementations use the IMS registration request for the triggering request 708. By way of example, the IP-CAN performs mobility related procedures (e.g., the MME in the case of LTE) and IP address management. The IP-CAN assigns a transport IP address to the UE 100. When the IP address of the UE changes, the UE has to re-register at the IMS (3GPP TS 23.228, Release 12, Clause 4.5).

For the purpose of IMS registration, the HSS 120 is also part of the IMS 104. E.g., the IMS 104 of the communications network 102, to which the UE 100 is attached, includes the P-CSCF 126, a Service CSCF (S-CSCF) 902, an Emergency CSCF (E-CSCF) 904 and the HSS 120. Upon registering at the IMS 104, the IMS 104 assigns the S-CSCF 902 to UE 100 (3GPP TS 23.228, Release 12, Clause 5.1.2.1).

Figure 9:
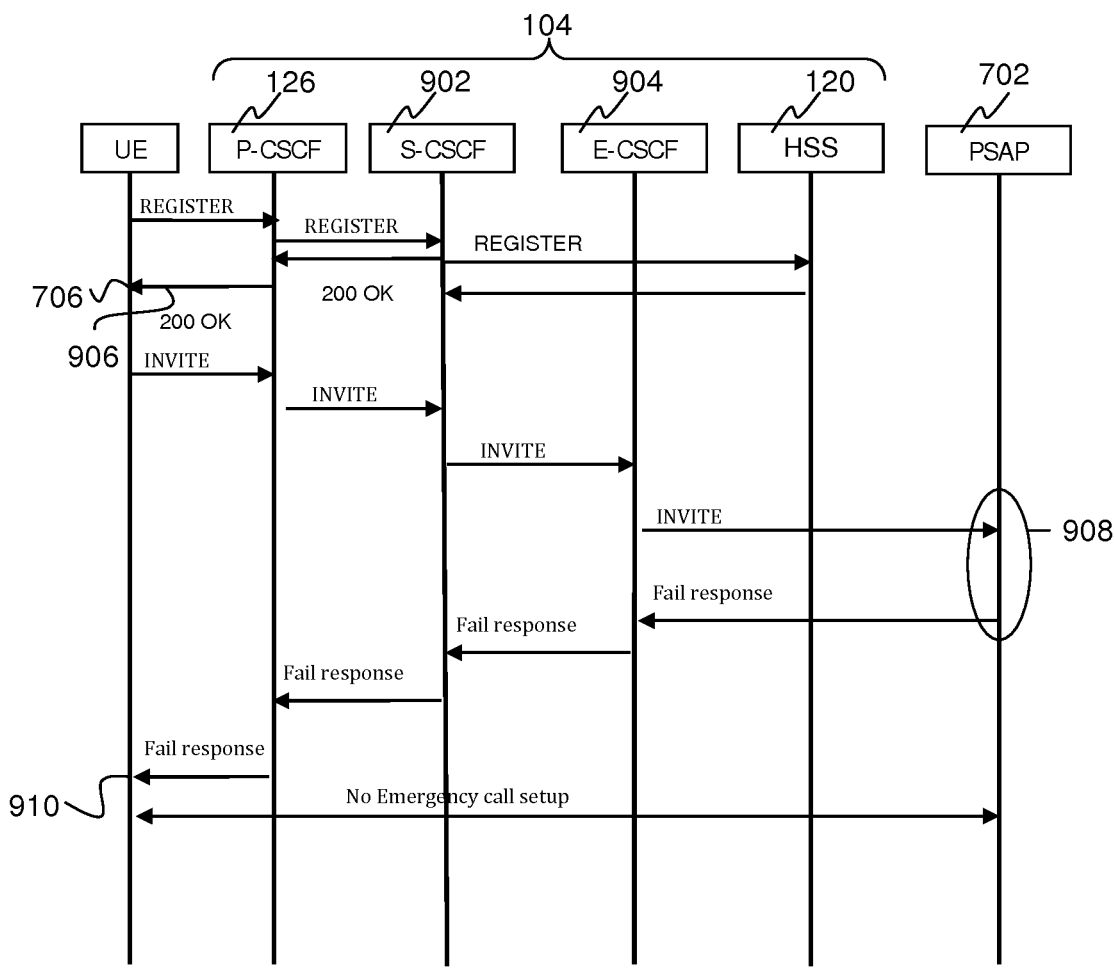
FIG. 9 illustrates a communication that triggers establishing an emergency session according to FIG. 7.

FIG. 9 schematically illustrates a communication sequence of a conventional reference example 900 that resulted in a UE failing to establish an emergency session in some situations. The UE registers to the IMS 104 by sending the request 708. E.g., the UE registers either as a normal registration or as an emergency registration. The UE tries initiating the emergency session by sending a SIP INVITE message 906 in the step 706. The message 906 is successively forwarded by the P-CSCF 126, the S-CSCF 902, the E-CSCF 904 to the PSAP 702. However, the session establishment fails in a step 908, e.g., at an external network, to which the PSAP 702 is connected, due to some reason. A failure response is received at the UE in a step 910. As a result, the conventional technique leaves the UE without an emergency session established.

Figure 10:
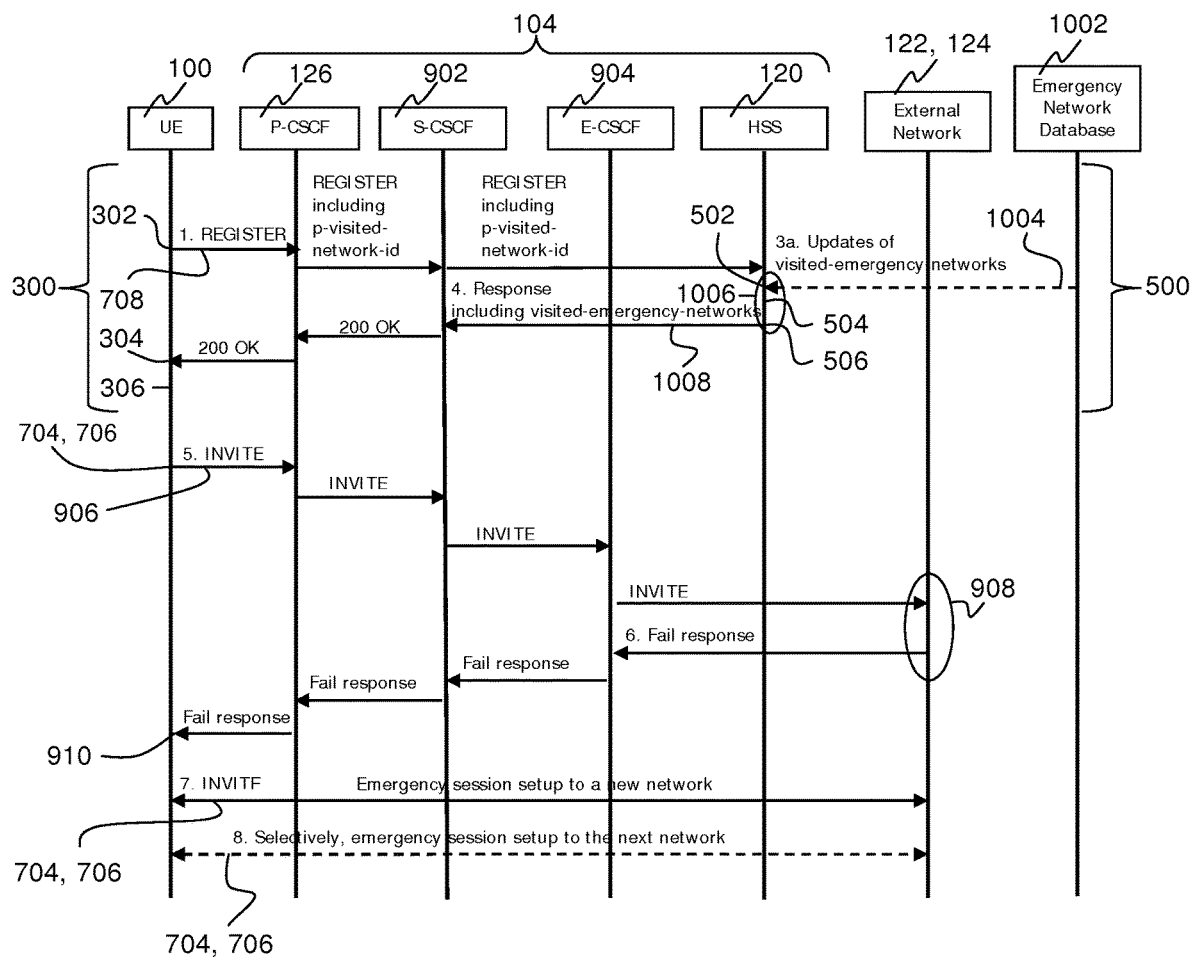
FIG. 10 illustrates a communication resulting from a first embodiment of the technique.

The present technique overcomes this drawback independent of the cause of the failure at the external network. FIG. 10 shows an implementation of the technique using the HSS 120 for implementing the device 400.

While FIG. 10 illustrates an exemplary implementation 1000 for the PSAP 702 being located in, or accessible via, the network 122 or 124, an analogous communication results if the communication is routed to the P-CSCF 132 or 134 (instead of the P-CSCF 126 shown in FIG. 10), e.g., according to the URI. In later case, the network 122 or 124 assumes the role of the network 104 indicated in FIG. 10, and the external network may be any packet-switched or circuit-switched network providing access to the PSAP 702.

The UE 100 sends a SIP REGISTER message 708 according to the step 302. The UE 100 registers either as a normal registration or as an emergency registration. The request is sent to the IMS 104. The P-CSCF 126 receives the request 708 adds the p-visited-network-id, e.g. according to RFC 7315, for indicating the communications network 102 to which the UE 100 is currently attached. Accordingly, the HSS 120 (which is located in the home network of the UE 100) is informed of the currently visited network if the UE 100 is roaming outside of the home network.

As the HSS 120 receives in the step 502 the request 708, the HSS 120 optionally determines the visited-emergency-networks information by querying a "global" emergency network database 1002. The global emergency network database 1002 includes available emergency networks 602 and provides updates 1004 to the HSS 120. Alternatively or in addition, the available emergency networks 602 are updated by the operator of the HSS.

The HSS 120 adds the received visited-emergency-networks information to a local database in the step 504. The local database of the HSS 120 may be structured as the configuration information 600 illustrated in FIG. 6.

The HSS 120 includes those networks 602 that are locally acceptable emergency networks for the UE 100, e.g., due to a country visited by the UE 100 or the visited network 102 (matched with the p-visited-network-id) of the UE 100 (or even specifically for the current geographical area of the UE 100), in the SIP 200 OK response message 1008 according to a sub-step 1006 of the step 506. E.g., the indicated networks 602 may be matched with an Emergency Network Access Identifier (NAI, 3GPP TS 23.003, Release 12, Clause 14.8) that is optionally provided by the UE 100.

In the step 304, the UE 100 receives the SIP 200 OK response message 1008 including the configuration information 600. The UE 100 updates the visited-emergency-networks information according to the step 306.

When the UE 100 determines that an emergency session is to be established, the UE 100 initiates an emergency session using the current network setting by sending the INVITE message 906 in a step 706 (shown at sequence number 5 in FIG. 10). Alternatively, the initial INVITE message 906 is also sent after consulting the list according to the step 704.

Similar to the reference example 900, the session establishment fails in certain situations, e.g., due to a failure at the external network 122.

The UE 100 determines in a subsequent step 704 (shown at sequence number 7 in FIG. 10) that the initial emergency session establishment has failed. The UE 100 may detect the failure based on an error code received in the step 910 or a timeout, etc. The UE 100 uses in the step 704 the maintained configuration information 600 on "visited-emergency-networks" 602 to choose an alternative network, e.g., 124, based on the criteria received in association with the indicated networks 602, e.g., the criteria 604, 606 and optionally 608.

In the step 706, the UE 100 initiates the emergency session establishment directed to the alternative network 124. The session is initiated unauthenticatedly over the alternative network 124.

In case the emergency session also fails on the alternative network 124, the UE 100 continues trying the next-ranked emergency network 602 on the list of specified "visited-emergency-networks" until the emergency session is successfully established according to the steps 704 and 706 (shown at sequence number 8 in FIG. 10).

In the exemplary implementation 1000 of the technique illustrated in FIG. 10, the configuration information 600 is dynamically updated to the device 400 from a source 1002 that has real-time knowledge about the different performances of the networks 602. In another exemplary implementation 1100 of the technique illustrated in FIG. 11, the configuration information 600 is statically configured in the device 400.

Figure 11:
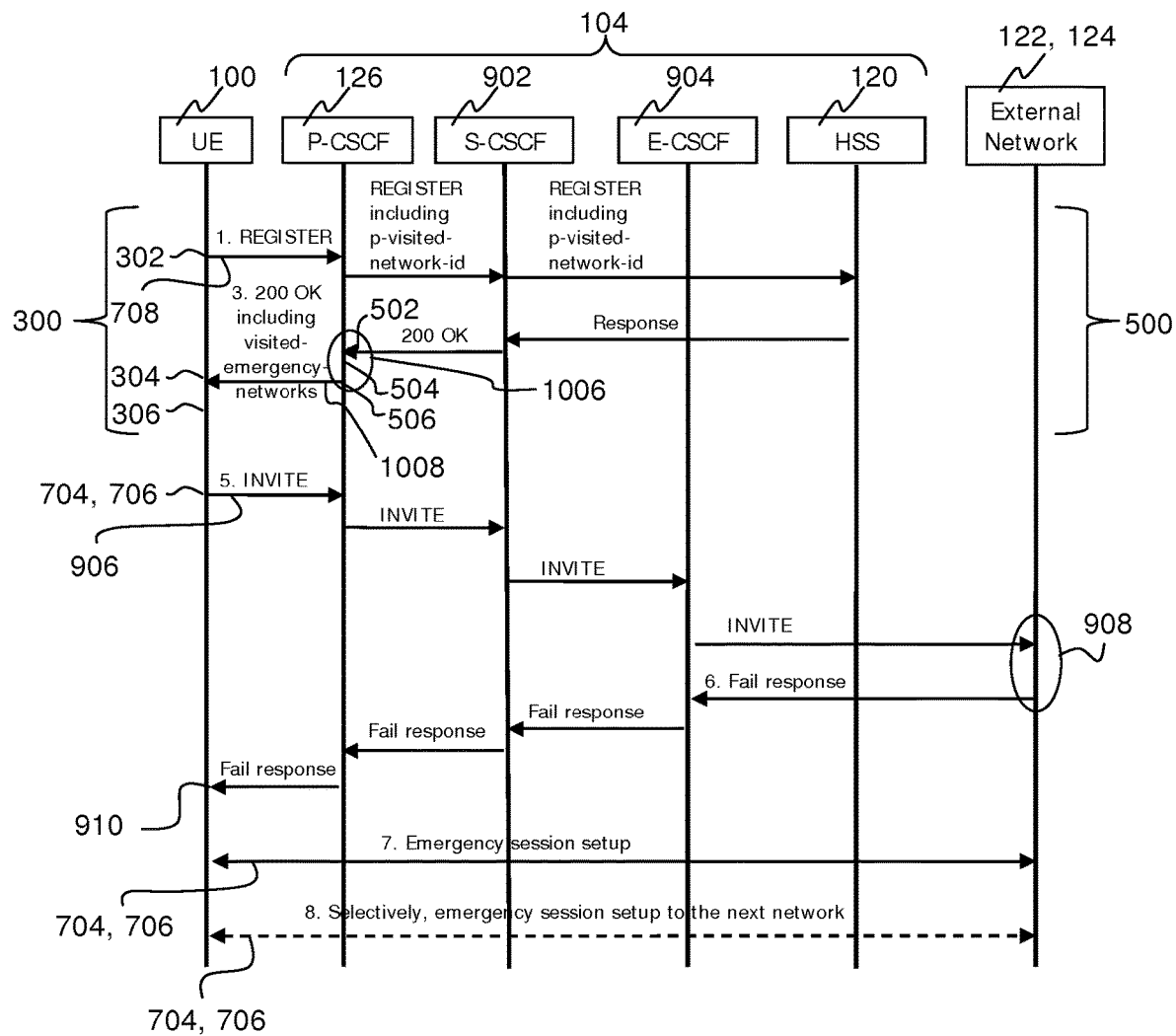
FIG. 11 schematically illustrates a communication resulting from a second embodiment of the technique.

FIG. 11 illustrates an implementation 1100 of the technique using the P-CSCF 126 for implementing the device 400. The UE 100 performs a SIP REGISTER, normally or as an emergency registration, according to the step 302. The P-CSCF 126 adds the p-visited-network-id to the request 708.

While the PSAP 702 is located in, or accessible via, the network 122 or 124 in the exemplary implementation 1100, an analogous communication results if the communication is routed to the P-CSCF 132 or 134 (instead of the P-CSCF 126 shown in FIG. 11), e.g., according to the URI. In later case, the network 122 or 124 assumes the role of the network 104 indicated in FIG. 11, and the external network may be any packet-switched or circuit-switched network providing access to the PSAP 702.

The P-CSCF 126 updates visited-emergency-networks information in a local database in the step 504. The update of the visited-emergency-networks information may be locally updated by the operators of the IMS network 102.

The P-CSCF includes the visited-emergency-networks information as the configuration information 600 from the local database in a sub-step 1006 of the step 506.

The UE 100 initiates an emergency session in the step 706 (shown at sequence number 5 in FIG. 11). If session establishment fails for some reason before it is setup, the UE 100 detects the error and uses the maintained list on visited-emergency-networks to choose a new network based on the criteria in the received configuration information 600 and the knowledge of available access in the step 704 (shown at sequence number 7 in FIG. 11).

Where appropriate, the UE 100 continues trying the list of specified visited-emergency-networks until it is successful in the subsequent steps 704, 706 (shown at sequence number 8 in FIG. 11).

As has become apparent from above description of exemplary embodiments, at least some embodiments establish an emergency session in situations of failing conventional techniques. For a user that is trying to establish an emergency session on an authenticated network in the IP-CAN domain but is unsuccessful, same or other embodiments automatically establish an emergency session in at least some situation.

Embodiments of the technique can automatically change the network or the networks in the IP-CAN domain until serving the user with the emergency service. Accordingly, a success rate for an end user emergency session establishment is increased. Problems with low success rates can be resolved without complicating the handling for the end user. The emergency can be resolved without endangering the situation and reason for making an emergency session.

Information for country-specific or geographically specific emergency networks may be defined. User equipments may be provided with a best matching mapping of available emergency networks. The available user equipment-specific networks may be ranked.

The technique can be implement at various nodes of a communications network, e.g. in an EPC, an HSS or a P-CSCF. The available specific networks may be transferred to the user equipment in a dedicated data field, so that the rank of the networks is individualizable for each user equipment.

At least some embodiments implement an automatic retry scheme in the user equipment if an emergency call fails, e.g. on an authenticated network, so as to automatically try a list of unauthenticated country-specific and/or geographically specific networks that are ranked.

Many advantages of the present invention will be fully understood from the foregoing description, and it will be apparent that various changes may be made in the form, construction and arrangement of the units and devices without departing from the scope of the invention and/or without sacrificing all of its advantages. Since the invention can be varied in many ways, it will be recognized that the invention should be limited only by the scope of the following claims.

The invention claimed is:

1. A method of operation by a User Equipment (UE), the method comprising:
    receiving configuration information via a message provided to the UE through a first cellular communications network, the configuration information comprising a list of cellular communications networks in rank order, for alternate use by the UE for emergency calling in the Internet Protocol (IP) domain;
    subsequently attempting to establish an emergency call in the IP domain via the first or a second cellular communications network, wherein the first or the second cellular communications network is an authenticated network with respect to the UE and the UE attempts to establish the emergency call in the IP domain via the first or the second cellular communications network as an authenticated emergency call; and
    responsive to detecting that the attempt to establish the authenticated emergency call failed, re-attempting the emergency call as an unauthenticated emergency call one or more times, with each re-attempt comprising:
        selecting one of the listed cellular communications networks according to the rank order, as a selected alternate network; and
        re-attempting to establish the emergency call in the IP domain via the selected alternate network as an unauthenticated network with respect to the UE.

2. The method of claim 1, wherein receiving the configuration information comprises receiving the configuration information in conjunction with attaching to or moving within the first or the second cellular communications network, as an authenticated cellular communications network.

3. The method of claim 1, wherein selecting one of the listed cellular communications networks according to the rank order comprises selecting one of the listed cellular communications networks as the selected alternate network in dependence on a geographic availability relative to a current location of the UE and, when more than one listed cellular communications network is geographically available, selecting a highest ranked one of the more than one of the listed cellular communications networks that is geographically available.

4. A User Equipment (UE) comprising:
    communication circuitry; and
    processing circuitry configured to:
        receive configuration information via the communication circuitry, the message provided to the UE through a first cellular communications network, the configuration information comprising a list of cellular communications networks in rank order, for alternate use by the UE for emergency calling in the Internet Protocol (IP) domain;
        subsequently attempt, via the communication circuitry, to establish an emergency call in the IP domain via the first or a second cellular communications network, wherein the first or the second cellular communications network is an authenticated network with respect to the UE and the UE attempts to establish the emergency call in the IP domain via the first or the second cellular communications network as an authenticated emergency call; and
        responsive to detecting that the attempt to establish the authenticated emergency call failed, re-attempt the emergency call as an unauthenticated emergency call one or more times via the communication circuitry, with the processing circuitry configured, for each re-attempt, to:
            select one of the listed cellular communications networks according to the rank order, as a selected alternate network; and
            re-attempt to establish the emergency call in the IP domain via the selected alternate network as an unauthenticated network with respect to the UE.

5. The UE of claim 4, wherein the processing circuitry is configured to receive the configuration information in conjunction with attaching to or moving within the first or the second cellular communications network, as an authenticated cellular communications network.

6. The UE of claim 4, wherein the processing circuitry is configured to select one of the listed cellular communications networks according to the rank order by selecting one of the listed cellular communications networks as the selected alternate network in dependence on a geographic availability relative to a current location of the UE and, when more than one listed network is geographically available, selecting a highest ranked one of the more than one of the listed cellular communications networks that is geographically available.

* * * * *